United States Patent [19]

Lew

[11] Patent Number: 4,841,810
[45] Date of Patent: Jun. 27, 1989

[54] DUAL ORBITING GEAR PLANETARY DRIVE

[76] Inventor: Hyok S. Lew, 7890 Oak St., Arvada, Colo. 80005

[21] Appl. No.: 12,679

[22] Filed: Feb. 9, 1987

Related U.S. Application Data

[63] Continuation-in-part of Ser. No. 891,124, Jul. 31, 1986, Pat. No. 4,733,579, and a continuation-in-part of Ser. No. 5,111, Jan. 20, 1987.

[51] Int. Cl.[4] ............................................. F16H 1/28
[52] U.S. Cl. ........................................ 74/804; 74/805
[58] Field of Search ................................. 74/804, 805

[56] References Cited

U.S. PATENT DOCUMENTS

| | | | |
|---|---|---|---|
| 987,430 | 3/1911 | Conant | 74/805 |
| 2,972,910 | 2/1961 | Menge, Sr. | 74/804 |
| 3,160,032 | 12/1964 | Black | 74/804 |
| 3,190,148 | 6/1965 | Flichy | 74/804 X |
| 3,472,097 | 10/1969 | Huska | 74/804 X |
| 3,726,158 | 4/1973 | Brown | 74/804 |
| 3,994,187 | 11/1976 | Milenkovic | 74/804 |
| 4,621,543 | 11/1986 | Gabilondo | 74/804 X |
| 4,640,154 | 2/1987 | Osborn | 74/805 |
| 4,665,771 | 5/1987 | Mitchell | 74/804 X |

FOREIGN PATENT DOCUMENTS

| | | | |
|---|---|---|---|
| 563282 | 5/1957 | Italy | 74/804 |
| 696145 | 8/1953 | United Kingdom | 74/804 |

Primary Examiner—Dirk Wright

[57] ABSTRACT

This invention discloses a planetary drive comprising a first rotary member with an internal circular cylindrical traction surface or an internal ring gear rotatably mounted on a first shaft in a first eccentric relationship with respect to the central axis of the first shaft, and a second rotary member with an external circular cylindrical traction surface or an external gear rotatably mounted on the first shaft in a second eccentric relationship with respect to the central axis of the first shaft wherein the first and second eccentric relationships are diametrically opposite to one another. One of the first and second rotary members is coupled to a second shaft disposed in line with the first shaft by a first flex coupling while the other of the first and second rotary members are coupled to a stationary frame rotatably supporting the first and second shafts by a second flex coupling, wherein the first and second flex couplings provide nonrotatable and laterally slidable coupling between two elements disposed in an axially parallel and radially off-set relationship.

22 Claims, 2 Drawing Sheets

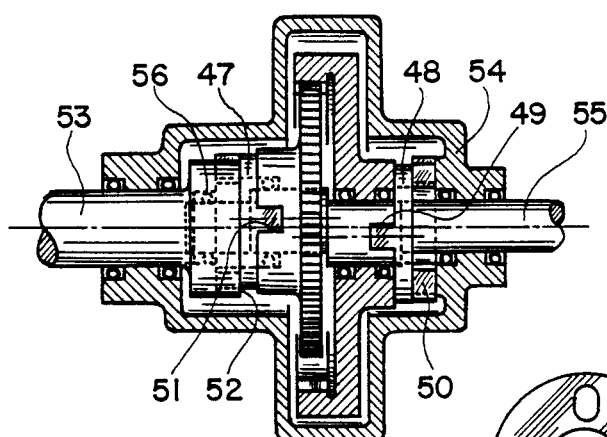
Fig. 7
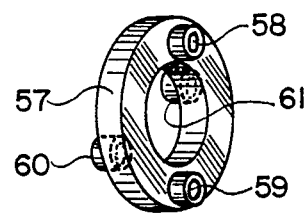
Fig. 8
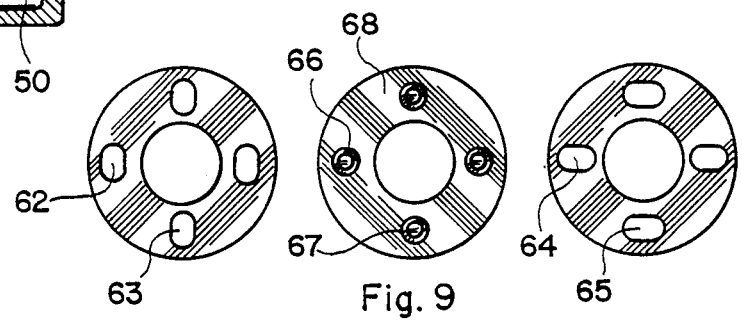
Fig. 9
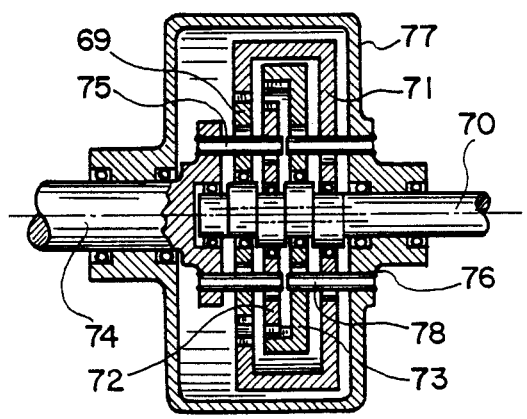
Fig. 10
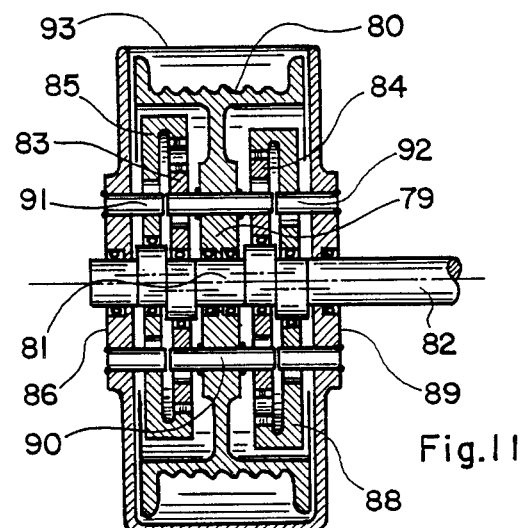
Fig. 11
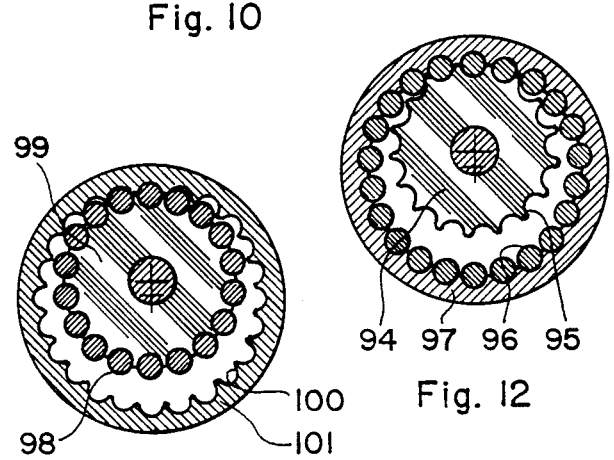
Fig. 12
Fig. 13
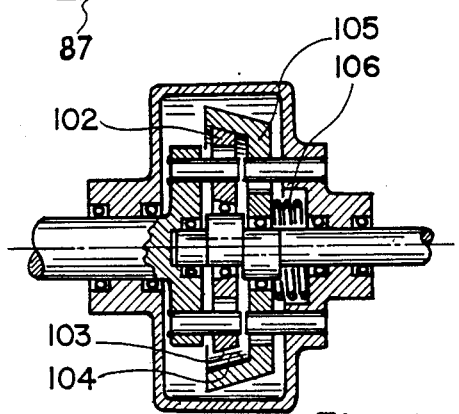
Fig. 14

DUAL ORBITING GEAR PLANETARY DRIVE

BACKGROUND OF THE INVENTION

This patent application is a continuation-in-part application to patent application Ser. No. 891,124, now U.S. Pat. No. 4,733,579, entitled "Orbiting ring gear planetary drive" filed on July 31, 1986 and patent application Ser. No. 005,111 entitled "Stepwise variable speed planetary drive" filed on Jan. 20, 1987 which is still pending.

The conventional planetary gear drive employs a plurality of orbiting gears disposed axisymmetrically about the common central axis of the input and output shafts, wherein the eccentric dimension from the common central axis to the central axis of the individual planetary gear is large, e.g., significantly greater than the radius of the planetary gear. In recent years, new planetary drives have been developed, which employ one or more planetary gears rotatably mounted on an input shaft in an eccentric relationship with a small eccentric dimension, wherein the planetary gear engages a stationary ring gear or roller ring disposed concentric with the common central axis of the input and output shafts. The planetary gear orbiting the common central axis of the input and output shafts and engaging the stationary ring gear is coupled to the output shaft by a flex coupling that allows a small radial shifting movements between the central axis of the output shaft and that of the planetary gear while it provides nonrotatable coupling therebetween. One of the most successful examples of these new generation planetary drives is the "Sumitomo Cyclo-Drive". In all of these new generation planetary drives, the orbiting eccentric planetary gear or sprocket has to engage the stationary concentric ring gear at one side, while the former has to disengage the latter at the other side diametrically opposite to that one side. As a consequence, the minimum theoretical eccentric dimension of the planetary gear has to be greater than one half of the difference between the major and minor diameter of the planetary gear or planetary sprocket. In actuality, the eccentric dimension of the planetary gear has to be much greater than the aforementioned minimum value in order to avoid interference between the teeth of the planetary gear and those of the stationary gear. The efficiency increases and the bulk of the planetary drive becomes smaller as the eccentric dimension of the planetary drive is close to the theoretical minimum value. The present invention teaches a new arrangement that enables one to construct a planetary drive with the eccentric dimension of the planetary gear as small as one half of the minimum theoretical value compatible with those existing new generation planetary drive.

SUMMARY OF THE INVENTION

The primary object of the present invention is to provide a new generation planetary drive with the minimum eccentric dimension for the planetary gear.

Another object is to provide a planetary drive comprising at least one combination including an orbiting planetary gear and an orbiting internal ring gear wherein the orbiting planetary gear is coupled to the output shaft by a flex coupling and the orbiting ring gear is coupled to a stationary frame by another flex coupling.

A further object is to provide a planetary drive comprising at least one combination of an orbiting sprocket and an orbiting roller ring.

Yet another object is to provide a planetary drive comprising at least one combination of an orbiting roller wheel and an orbiting internal ring sprocket.

Yet a further object is to provide a planetary drive comprising at least one combination of an orbiting gear with modified teeth and an orbiting internal ring gear with modified teeth.

Still another object is to provide a planetary drive comprising at least one combination of an orbiting friction wheel and an orbiting friction ring wheel.

Still a further object is to provide a planetary drive with a high speed reduction ratio and high torque transmission capability.

These and other objects of the present invention will become clear as the description thereof proceeds.

BRIEF DESCRIPTION OF THE FIGURES

The present invention may be described with a great clarity and specificity by referring to the following figures:

FIG. 7 illustrates a cross section of yet another embodiment of the planetary drive of the present invention.

FIG. 8 illustrates a perspective view of an element included in a flex coupling usable in conjunction with the present invention.

FIG. 9 illustrates threee elements constituting another flex coupling usable in conjunction with the present invention.

FIG. 10 illustrates a cross section of the planetary drive of the present invention that employs two sets of dual orbiting traction wheels.

FIG. 11 illustrates a cross section of the planetary drive of the present invention employing two sets of dual orbiting traction wheels that is particularly suitable for a winch drive.

FIG. 12 illustrates an embodiment of the combination of dual orbitingh traction wheels.

FIG. 13 illustrates another embodiment of the combination of dual orbiting traction wheels.

FIG. 14 illustrates a cross section of the planetary drive of the present invention that employs a combination of dual orbiting friction drive wheels.

DESCRIPTION OF THE ILLUSTRATED EMBODIMENTS

Figure 1:
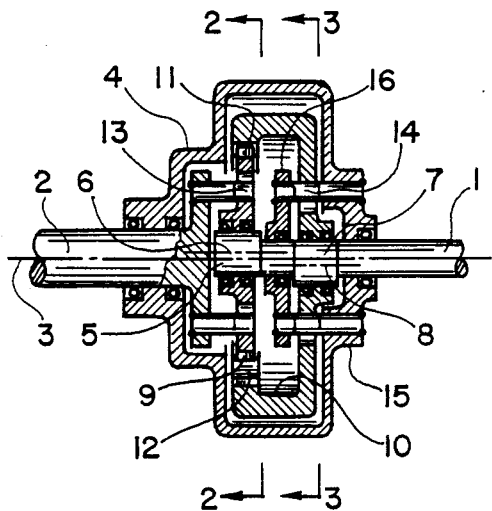
FIG. 1 illustrates a cross section of an embodiment of the planetary drive constructed in accordance with the principles of the present invention.

In FIG. 1 there is illustrated a cross section of an embodiment of the planetary drive constructed in accordance with the principles of the present invention. An input shaft 1 and an output shaft 2 having a common central axis 3 are disposed in line and rotatably supported by a plurality of bearings secured to the frame or housing 4 of the planetary drive. The input shaft 1 includes a first eccentric journal 5 with central axis 6 and a second eccentric journal 7 with central axis 8. A first rotary member with an external circular cylindrical traction surface or a planetary gear 9 is rotatably mounted on the first eccentric journal 5, while the second rotary member with an internal circular cylindrical traction surface or an internal ring gear 10 is rotatably mounted on the second eccentric journal 7. For the brevity of the description, the terminology of "orbiting gear" and "orbiting internal ring gear" will be used hereafter to imply the "first rotary member with an external circular cylindrical traction surface" and the "second rotary member with an internal circular cylindrical traction surface", respectively. It should be understood that the "circular cylindrical traction surface" implies the "circular cylindrical surface" with gear teeth or modified gear teeth or sprocket teeth or rollers or friction drive surfaces, etc. The orbiting gear 9 and the orbiting internal ring gear 10 engage one another at the engaging side 11, while they disengage at the disengaging side 12 due to the diametrically opposing eccentricities of the two eccentric journals 5 and 7. It should be mentioned that the two eccentric journal 5 and 7 should be off-set from the common central axis 3 of the input and output shafts in two generally opposite directions wherein the two off-set dimensions may be the same or different. The orbiting gear 9 is coupled to the output shaft 2 by a first flex coupling 13, while the orbiting internal ring gear 10 is coupled to the stationary flange 15 affixed to the frame 4 in a concentric relationship with respect to the input shaft 1 by a second flex coupling 14. The first and second couplings 13 and 14 respectively provide a nonrotatable and laterally shiftable coupling between the two elements coupled thereby. An additional bearing secured to a stationary flange 16 disposed intermediate the orbiting gear 9 and the orbiting internal ring gear 10 may be employed to provide an additional rotatable support for the input shaft 1. The stationary flange 16 is rigidly affixed to the stationary flange 15 forming a part of the frame 4.

Figure 2:
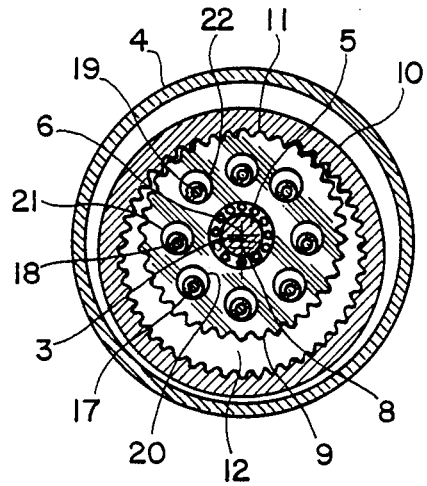
FIG. 2 illustrates another cross section of the embodiment dhown in FIG. 1.

In FIG. 2 there is illustrated another cross section of the embodiment shown in FIG. 1, which cross section is taken along plane 2-2 as shown in FIG. 1. The orbiting gear 9 and the orbiting internal ring gear 10 rotatably mounted on two eccentric journals 5 and 7 affixed to the input shaft 1 in a parallel and diametrically opposite off-set relationship, respectively, engage one another at the tight side 11 and disengage at the loose side 12. The flex coupling 13 comprises a plurality of posts 17, 18, 19, etc., including sleeve bearings mounted thereon, which respectively engage a plurality of over-sized holes 20, 21, 22, etc., included in the orbiting gear 19. The plurality of circular cylindrical posts 17, 18, 19, etc., disposed axisymmetrically about the central axis 3 of the output shaft 2 extends rigidly from a flange affixed to the output shaft 2. Each of the plurality of over-sized circular holes 20, 21, 22, etc., included in the orbiting gear 9 in an axisymmetric arrangement about the central axis 6 of the first eccentric journal 5 has a diameter equal to the outside diameter of the sleeve bearings mounted on the circular cylindrical posts 17, 18, 19, etc., plus two times the first eccentric dimension.

Figure 3:
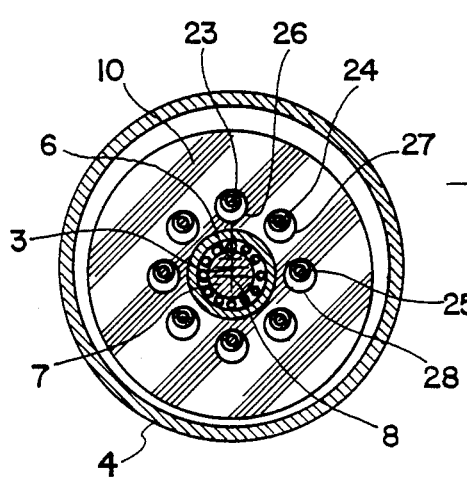
FIG. 3 illustrates a further cross section of the embodiment shown in FIG. 1.

In FIG. 3 there is illustrated a further cross section of the embodiment shown in FIG. 1, which cross section is taken along plane 3—3 as shown in FIG. 1. The flex coupling 14 comprises a plurality of circular cylindrical posts 23, 24, 25, etc., including sleeve bearings mounted thereon, which respectively engage a plurality of over-sized circular holes 26, 27, 28, etc., included in the orbiting internal ring gear 10 in an axisymmetric arrangement about the central axis 8 of the second eccentric journal 7. The plurality of circular cylindrical posts 23, 24, 25, etc., extending rigidly from the stationary flange 15 are disposed axisymmetrically about the central axis 3 of the input shaft 1. The over-sizing of the circular holes 26, 27, 28, etc., satisfies the same relationship as that described in conjunction with FIG. 2. It should be noticed that the plurality of the posts 23, 24, 25, etc., are used to tie the bearing flange 16 shown in FIG. 1 to the stationary flange 15 forming a part of the frame 4.

The dual orbiting gear planetary drive of the present invention illustrated in FIGS. 1, 2 and 3 operates on the following principles: The rotating motion of the input shaft 1 causes the orbiting internal ring gear 10 to orbit the central axis 3 of the input shaft 1 without rotating about its own central axis 8 as it is orbitably and nonrotatably coupled to the stationary flange 15 by the flex coupling 14. The rotating motion of the input shaft 1 causes the orbiting gear 9 to orbit the central axis 3 of the input shaft. Since the pitch diameter of the orbiting gear 9 is smaller than the pitch diameter of the orbiting internal ring gear 10, the orbiting motion of the orbiting gear 9 creates a rotating motion there of about the central axis thereof. Since the orbiting gear 9 is coupled to the output shaft 2 by the flex coupling 13 in an orbitable and nonrotatable relationship, the rotating motion of the orbiting gear 9 is directly transmitted to the output shaft 2. It can be easily shown that the ratio of the rotating speed $\Omega_2$ of the output shaft 2 to that $\Omega_1$ of the input shaft is given by equation $$\frac{\Omega_2}{\Omega_1} = -\frac{2e_{ex}}{D_{ex}},$$

where $e_{ex}$ and $D_{ex}$ are the eccentric dimension and pitch diameter of the orbiting ring gear 9, respectively. It can also be shown easily that, when the orbiting gear 9 and the orbiting internal ring gear 10 are interchanged to one another in an embodiment shown in FIGS. 1, 2 and 3, the transmission ratio is given by equation $$\frac{\Omega_2}{\Omega_1} = +\frac{2e_{in}}{D_{in}}.$$

where $e_{in}$ and $D_{in}$ are the eccentric dimension and the pitch diameter of the orbiting internal ring gear 10 now installed in place where the orbiting gear 9 was installed. These two equations underscore the importance of the advantage provided by the dual orbiting gear arrangement of the present invention wherein both gears orbit, which arrangement enables one to minimize the eccentric dimension e. The minimum eccentric dimension implies a high reduction ratio and minimum orbiting motion, which are the two golden rules in the kinematics and dynamics of planetary gear reducer design. In general, it is desirable to select the combination wherein $e_{ex}=e_{in}$ and the two orbiting gears are mass balanced about the central axis of the input shaft.

Figure 4:
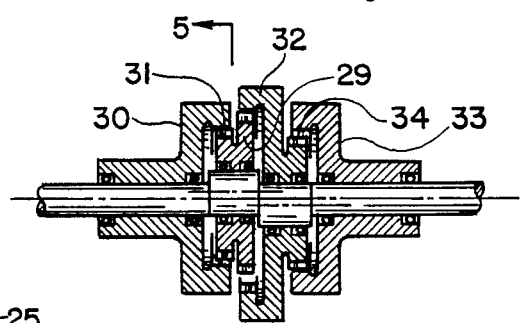
FIG. 4 illustrates a cross section of another embodiment of the planetary drive of the present invention.

In FIG. 4 there is illustrated a cross section of another embodiment of the dual orbiting gear planetary drive of the present invention. This planetary drive operating on the same principles has essentially the same construction as the embodiment shown in FIGS. 1, 2 and 3 with two exceptions; Firstly, the orbiting ring gear 29 is coupled to a first rotatable flange 30 by a first flex coupling 31, while the orbiting internal ring gear 32 is coupled to a second rotatable flange 33 by a flex coupling 34. As a consequence, one of the two rotatable flanges can be used as a power output device when the other of the two rotatable flanges is nonrotatably secured. Secondly, the flex couplings 31 and 34 respectively comprise a combination of an external gear concentrically included in the orbiting gear 29 or orbiting internal ring gear 32 about the central axis thereof and an internal gear concentrically included in the rotatable flange 30 or 33 about the central axis thereof, which flex couplings are further described in conjunction with FIG. 5.

Figure 5:
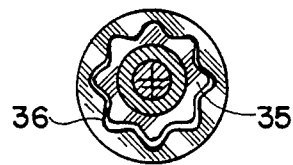
FIG. 5 illustrates another cross section of the embodiment shown in FIG. 4.

In FIG. 5 there is illustrated another cross section of the embodiment shown in FIG. 4, which cross section is taken along plane 5—5 as shown in FIG. 4. The flex couplings 31 and 34 respectively comprise a set of external gear teeth 35 concentrically included in the orbiting gear and a set of internal gear teeth 36 concentrically included in the rotatable flange. Of course, the set of internal gear teeth may be included in the orbiting gear, while the set of external gear teeth may be included in the rotatable flange. The type of flex coupling shown in FIG. 5 is simpler and has a higher torque capacity compared with the flex coupling shown in FIG. 3. The smaller the eccentric dimension is, simpler the design of flex coupling becomes, which fact underscores a further advantage provided by the dual orbiting gear planetary drive of the present invention that employs the minimum eccentric dimension.

Figure 6:
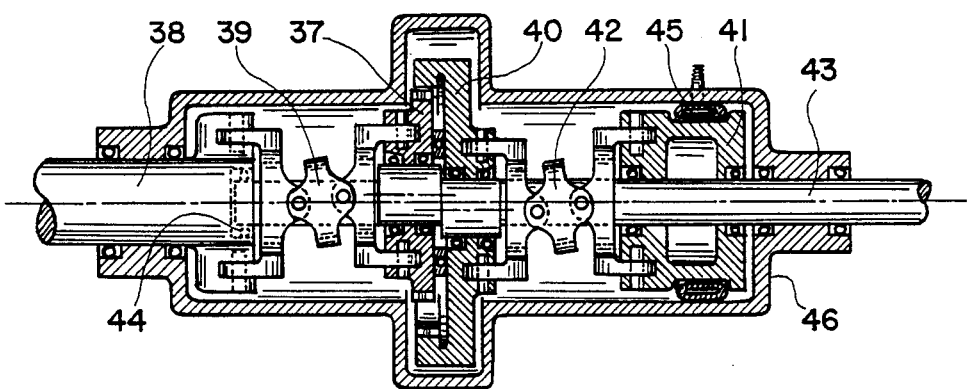
FIG. 6 illustrates a cross section of a further embodiment of the planetary drive of the present invention.

In FIG. 6 there is illustrated a cross section of a further embodiment of the dual orbiting gear planetary drive of the present invention, that has essentially the same construction as the embodiment shown in FIGS. 1, 2 and 3 with two exceptions. The orbiting gear 37 is coupled to the output shaft 38 by a first universal joint 39, while the orbiting internal ring gear 40 is coupled to a clutch drum 41 by a second universal joint 42. The clutch drum 41 rotatably mounted on the input shaft 43 that extends through the two universal joints 39 and 42 and is supported by a bearing 44 included in the output shaft 38, includes a braking means 45. When the braking means 45 is deactivated, the rotating motion of the input shaft 43 is transmitted to the clutch drum 41 that is rotatable freely. When the bracking means 45 is activated, the clutch drum 41 is not allowed to rotate and, consequently, the rotating motion of the input shaft 43 is transmitted to the output shaft 38. It is clear that the planetary drive of this embodiment may be constructed without including the built-in clutch 41, wherein the orbiting internal ring gear 40 is coupled directly to the frame or housing 46 by the second universal joint 42. It is also clear that the orbiting gear 37 and the orbiting internal ring gear 40 can be interchanged in the installation thereof.

In FIG. 7 there is illustrated a cross section of yet another embodiment of the dual orbiting gear planetary drive of the present invention, which has essentially the same construction as the embodiment illustrated in FIGS. 1, 2 and 3 with the exception of the flex couplings. The two flex couplings 47 and 48 employed in this embodiment respectively include an annular disc with two sliding keys 49 and 50 respectively affixed to the two end faces of the two disc in two radial directions perpendicular to one another. The first of the two radial keys slidably engages a radial groove 51 included in the orbiting gear or orbiting internal ring gear, while the second radial key slidably engages a radial groove 52 includes in the flange affixed to the output shaft 53 or the housing 54 of the planetary drive. The annular disc included in the flex couplings 47 and 48 includes a central hole, through which the input shaft 55 extends. The extremity of the input shaft 55 adjacent to the output shaft may be supported by a bearing 56 included in the adjacent extremity of the output shaft 53.

In FIG. 8 there is illustrated a perspective view of another embodiment of the annular disc usable in conjunction with the type of flex couplings included in the planetary drive embodiment illustrated in FIG. 7. In place of the radial keys included in the annular disc employed in the flex couplings described in conjunction with FIG. 7, the annular disc 57 employs two sets of pluralities of cam rollers 58, and 59, and 60 and 61, wherein the two sets of cam rollers are respectively affixed to two sides of the annular disc 57 in two radial alignments perpendicular to one another. It is clear that each alignment of the cam rollers included in one side of the annular disc may include four, six or eight cam rollers instead of the two employed in the particular embodiment shown in FIG. 8.

In FIG. 9 there is illustrated three elements constituting a further embodiment of the flex coupling usable in place of those shown in FIGS. 3, 5, 6, 7 and 8. This flex coupling comprises a first set of pluralities of slotted holes 62, 63, etc., oriented in the first direction, which are included in the orbiting ring gear or orbiting internal ring gear in an axisymmetric arrangement about the central axis thereof and a second set of pluralities of slotted holes 64, 65, etc., oriented in the second direction perpendicular to the first direction, which are axisymmetrically included in a flange affixed to the output shaft or the housing in a coaxial relationship with respect to the common central axis of the input and output shafts. These two sets of pluralities of slotted holes are engaged by a plurality of circular cylindrical posts 66, 67, etc., including sleeve bearings with diameters matched to the width of the slotted holes, which circular cylindrical posts distributed axisymmetrically about the central axis of the annular disc 68 extend rigidly therefrom in the two opposite axial directions.

In FIG. 10 there is illustrated a cross section of an embodiment of the planetary drive of the present invention that employs two sets of dual orbiting gears. The first orbiting gear 69 rotatably mounted on the input shaft 70 in a first eccentric relationship engages the first orbiting internal ring gear 71 rotatably mounted on the input shaft 70 in a second eccentric relationship, while the second orbiting gear 72 rotatably mounted on the input shaft 70 in the second eccentric relationship engages the second orbiting internal ring gear 73 rotatably mounted on the input shaft 70 in the first eccentric relationship. The first and second orbiting gears 69 and 70 are coupled to the output shaft 74 by a common flex coupling 75 of the type described in conjuntion with FIGS. 2 and 3, while the first and second orbiting internal ring gears 71 and 73 are coupled to the stationary flange 76 forming a part of the housing or frame 77 by another common flex coupling 78 of the type illustrated in FIGS. 2 and 3. The ratio of the pitch diameter of the orbiting gear and that of the orbiting internal ring gear included in each set of the dual orbiting gear combinations must be the same for all sets of the dual orbiting gear combinations.

In FIG. 11 there is illustrated an embodiment of the planetary drive of the present invention that is particularly suitable for a winch drive. The hub 79 of the winch drum 80 is rotatably mounted on the concentric midsection 81 of the input shaft 82 intermediate the first and second orbiting gears 83 and 84 rotatably mounted on the input shaft 82 in the first and second eccentric relationships, respectively. The first orbiting internal ring gear 85 disposed adjacent to one end flange 86 of the housing 87 is rotatably mounted on the input shaft 82 in the second eccentric relationship, while the second orbiting internal ring gear 88 disposed adjacent to the other end flange 89 of the housing 87 is rotatably mounted on the input shaft 82 in the first eccentric relationship. The first and second eccentric orbiting gears 83 and 84 are coupled to the hub 79 of the winch drum 80 by a common flex coupling 90 of the type desribed in conjunction with FIGS. 2 and 3. The first and second eccentric internal orbiting ring gears 85 and 88 are respectively coupled to the end flanges 86 and 89 forming part of the housing 87 by two separate flex couplings 91 and 92. The housing 87 has an opening 93 providing a passage for the winch cable.

In FIG. 12 there is illustrated an example of the modified gear teeth or sprocket teeth usable in conjunction with the present invention. The orbiting gear 94 includes a set of sprocket teeth 95 engaging a set of rollers 96 included in the orbiting internal ring gear 97.

In FIG. 13 there is illustrated another example of the modified gear teeth or sprocket teeth compatible with the dual orbiting gear arrangement of the present invention. The set of rollers 98 is included in the orbiting gear 99, while the set of internal sprocket teeth 100 is included in the orbiting internal ring gear 101. The set of rollers 98 included in the orbiting gear 99 may be actual rollers secured to the orbiting gear 99 or a closed loop of roller chain or that of two sides timing belt lapped around the orbiting gear 99 including a set of sprocket teeth.

In FIG. 14 there is illustrated a cross section of an embodiment of the planetary drive of the present invention, that employs friction drive surfaces instead of meshing teeth. The dual orbiting friction wheel planetary drive has essentially the same construction as the embodiment shown in FIGS. 1, 2 and 3 with the exception that the gear teeth are now replaced with the friction drive surfaces. The first orbiting friction wheel 102 includes a tapered external circular cylindrical friction surface 103 that is under a pressurized contact with an internal circular cylindrical friction surface 104 with a matching taper, which is included in the second orbiting friction wheel 105. The pressurized engagement between the two tapered friction drive surfaces 103 and 104 is maintained by a spring bias provided by a coil spring 106.

The novelty and patentability of the present invention lies in the teaching of the dual orbiting gear arrangement wherein both the spur gear and the internal ring gear orbit the central axis of the input shaft, which contrasts the existing art wherein only one of the two gears orbit while the other remains stationary. The specific design of the gear teeth or sprocket teeth as well as the specific construction of the flex coupling usable in conjunction with the present invention is considered as a matter of design. While the principles of the present invention have now been made clear by the illustrative embodiments, there will be immediately obvious to those skilled in the art many modifications of the structures, arrangements, proportions, elements and materials which are particularly adapted to the specific working environments and operating conditions in the practice of the invention without departing from those principles.

I claim:

1. A mechanical transmission apparatus comprising in combination:
    (a) a frame;
    (b) a power output member of generally axisymmetric construction rotatably secured to the frame;
    (c) a shaft disposed coaxially with the power output member and rotatably secured to the frame, said shaft including at least two first eccentric cylindrical sections and at least two second eccentric cylindrical sections wherein the first and second eccentric cylindrical sections are disposed in two generally opposing eccentric arrangements;
    (d) at least two first rotary members respectively mounted on one of said two first eccentric cylindrical sections of the shaft and one of said two second eccentric cylindrical sections of the shaft in rotatable arrangement, each of said two first rotary members including an external generally circular cylindrical traction surface of a first pitch diameter disposed in a coaxial arrangement about the central axis of respective eccentric cylindrical section of the shaft mounted thereby;
    (e) at least two second rotary members respectively mounted on the other of said two first eccentric cylindrical sections of the shaft and the other of said two second eccentric cylindrical sections of the shaft in rotatable arrangement, each of said two second rotary members including an internal generally circular cylindrical traction surface having a second pitch diameter greater than said first pitch diameter and disposed in a coaxial arrangement about the central axis of respective eccentric cylindrical section of the shaft mounted thereby; wherein, a portion of each of said external generally circular cylindrical traction surfaces engages a portion of each of said internal generally circular cylindrical traction surfaces in a nonslipping relationship;
    (f) a first set of coupling nonrotatably coupling one pair of the two first and two second rotary members to the power output member in a radially shiftable relationship therebetween; and
    (g) a second set of coupling nonrotatably coupling the other pair of the two first and two second rotary members to a cylindrical member in a radially shiftable relationship therebetween.

2. The combination as set forth in claim 1 wherein said cylindrical member is rigidly affixed to the frame.

3. The combination as set forth in claim 2 wherein said external and internal generally circular cylindrical traction surfaces include gear teeth which provide the nonslipping engagement therebetween by means of meshing gear teeth.

4. The combination as set forth in claim 2 wherein said external and internal generally circular cylindrical traction surfaces respectively include sprocket teeth and rollers which provide the nonslipping engagement therebetween by means of the sprocket teeth meshing with the rollers.

5. The combination as set forth in claim 2 wherein said external and internal generally circular cylindrical traction surfaces respectively include rollers and sprocket teeth which provide the nonslipping engagement therebetween by means of the sprocket teeth meshing with the rollers.

6. The combination as set forth in claim 2 wherein said external and internal generally circular cylindrical traction surfaces include friction surfaces of high friction coefficient under a pressurized frictional contact therebetween.

7. The combination as set forth in claim 1 wherein the cylindrical member is rotatably mounted on the shaft and includes a braking means that prevents or allows the rotating motion of the cylindrical member.

8. The combination as set forth in claim 7 wherein said external and internal generally circular cylindrical traction surfaces include gear teeth which provide the nonslipping engagement therebetween by means of meshing gear teeth.

9. The combination as set forth in claim 7 wherein said external and internal generally circular cylindrical traction surfaces respectively include sprocket teeth and rollers which provide the nonslipping engagement.

10. The combination as set forth in claim 7 wherein said external and internal generally circular cylindrical traction surfaces respectively include rollers and sprocket teeth which provide the nonslipping engagement therebetween by means of the sprocket teeth meshing with the rollers.

11. A mechanical transmission apparatus comprising in combination:
  (a) frame;
  (b) a power output member of genreally axisymmetric construction rotatably supported by the frame;
  (c) a shaft disposed in line with the power output member and rotatably supported by the frame; said shaft including a first and second eccentric section disposed in two generally opposing eccentric arrangements, respectively;
  (d) a first rotary member rotatably mounted on said first eccentric section of the shaft, said first rotary member including an external generally circular cylindrical traction surface of a first pitch diameter disposed in a coaxial arrangement about the central axis of said first eccentric section of the shaft, and a plurality of circular holes with central axis parallel to the shaft disposed on a circle concentric to the central axis of said first eccentric section of the shaft;
  (e) a second rotary member rotatably mounted on said second eccentric section of the shaft, said second rotary member including an internal generally circular cylindrical traction surface having a second pitch diameter greater than said first pitch diameter and disposed in a coaxial arrangement about the central axis of said second eccentric section of the shaft, and a plurality of circular holes with central axis parallel to the shaft disposed on a circle concentric to the central axis of said second eccentric section of the shaft; wherein, a portion of said external generally circular cylindrical traction surface engages a portion of said internal generally circular cylindrical traction surface in an nonslipping relationship;
  (f) a plurality of circular cylindrical posts disposed on a circle concentric to the central axis of the shaft and rigidly affixed to a member nonrotatably secured to the power output member and respectively engaging the plurality of circular holes included in one of the first and second rotary member in a clearance relationship allowing orbiting motion of said one of the first and second rotary member about the central axis of the shaft, wherein the combination of the circular holes and the circular cylindrical posts provides a coupling that transmits rotating motion of said one of the first and second rotary member created by the orbiting motion thereof to the power ouptut member; and
  (g) a plurality of circular cylindrical posts disposed on a circle concentric to the central axis of the shaft and rigidly affixed to a member supported by the frame and respectively engaging the plurality of circular holes included in the other of the first and second rotary member in a clearance relationship allowing orbiting motion of said the other of the first and second rotary member about the central axis of the shaft, wherein the combination of the circular holes and the circular cylindrical posts provides a coupling that disallows rotating motion of said the other of the first and second rotary member relative to the frame.

12. The combination as set forth in claim 11 wherein said member supported by the frame is an integral part of the frame.

13. The combination as set forth in claim 11 wherein said member supported by the frame is rotatably mounted on the shaft and said combination includes a brake means preventing said member supported by the frame from rotating when said brake means is activated and allowing said member supported by the frame to rotate substantially freely when said brake means is deactivated.

14. The combination as set forth in claim 11 wherein said external and internal generally circular cylindrical traction surfaces comprise gear teeth which provide the nonslipping engagement therebetween by means of meshing gear teeth.

15. The combination as set forth in claim 11 wherein said external and internal generally circular cylindrical traction surfaces comprise a combination of sprocket teeth and rollers, which combination provides the nonslipping engagement therebetween by means of the sprocket teeth meshing with the rollers.

16. The combination as set forth in claim 11 wherein said external and internal generally circular cylindrical traction surfaces comprise friction surfaces of high friction coefficient under a pressurized frictional contact therebetween.

17. A mechanical transmission apparatus comprising in combination:
  (a) frame;
  (b) a power output member of generally axisymmetric construction rotatably supported by the frame;
  (c) a shaft disposed in line with the power output member and rotatably supported by the frame; said shaft including a first and second eccentric section disposed in two generally opposing eccentric arrangements, respectively;
  (d) a first rotary member rotatably mounted on said first eccentric section of the shaft, said first rotary member including an external generally circular cylindrical traction surface of a first pitch diameter disposed in a coaxial arrangement about the central axis of said first eccentric section of the shaft;
  (e) a second rotary member rotatably mounted on said second eccentric section of the shaft, said second rotary member including an internal generally circular cylindrical traction surface having a second pitch diameter greater than said first pitch diameter and disposed in a coaxial arrangement about the central axis of said second eccentric section of the shaft, wherein a portion of said external generally circular cylindrical traction surface engages a portion of said internal generally circular cylindrical traction surface in a nonslipping relationship;

(f) a first universal joint nonrotatably coupling one of the first and second rotary member to the power output member in a radially shiftable relationship therebetween, whereby said first universal joint transmits rotating motion of said one of the first and second rotary member created by orbiting motion thereof about the central axis of the shaft to the power output member; and (g) a second universal joint nonrotatably coupling the other of the first and second rotary member to a member supported by the frame in a radially shifting relationship therebetween, whereby said second universal joint disallows rotating motion of said the other of the first and second rotary member relative to said frame while allowing orbiting motion thereof about the central axis of the shaft.

18. The combination as set forth in claim 17 wherein said member supported by the frame is an integral part of the frame.

19. The combination as set forth in claim 17 wherein said member supported by the frame is rotatably mounted on the shaft and said combination includes a brake means preventing said member supported by the frame from rotating when said brake means is activated and allowing said member supported by the frame to rotate substantially freely when said brake means is deactivated.

20. The combination as set forth in claim 17 wherein said external and internal generally circular cylindrical traction surfaces comprise gear teeth which provide the nonslipping engagement therebetween by means of meshing gear teeth.

21. The combination as set forth in claim 17 wherein said external and internal generally circular cylindrical traction surfaces comprise a combination of sprocket teeth and rollers, which combination provides the nonslipping engagement therebetween by means of the sprocket teeth meshing with the rollers.

22. The combination as set forth in claim 17 wherein said external and internal generally circular cylindrical traction surfaces comprise friction surfaces of high friction coefficient under a pressurized frictional contact therebetween.

* * * * *